US009344827B2

(12) United States Patent
Zhu et al.

(10) Patent No.: US 9,344,827 B2
(45) Date of Patent: May 17, 2016

(54) METHOD AND APPARATUS FOR AUDIO OUTPUT, AND ELECTRONIC DEVICE

(71) Applicant: Sony Corporation, Tokyo (JP)

(72) Inventors: Zhenliang Zhu, Beijing (CN); Xiao Yang, Beijing (CN); Hui Zou, Beijing (CN)

(73) Assignee: Sony Corporation, Tokyo (JP)

( * ) Notice: Subject to any disclaimer, the term of this patent is extended or adjusted under 35 U.S.C. 154(b) by 34 days.

(21) Appl. No.: 14/404,369

(22) PCT Filed: Jul. 10, 2014

(86) PCT No.: PCT/IB2014/062996
§ 371 (c)(1),
(2) Date: Nov. 26, 2014

(87) PCT Pub. No.: WO2015/068057
PCT Pub. Date: May 14, 2015

(65) Prior Publication Data
US 2015/0289076 A1 Oct. 8, 2015

(30) Foreign Application Priority Data
Nov. 6, 2013 (CN) .......................... 2013 1 0544731

(51) Int. Cl.
*H04R 5/02* (2006.01)
*H04R 5/00* (2006.01)
(Continued)

(52) U.S. Cl.
CPC ............. *H04S 7/00* (2013.01); *H04M 1/72558* (2013.01); *H04R 3/12* (2013.01); *H04R 5/02* (2013.01);
(Continued)

(58) Field of Classification Search
CPC .................................. H04R 5/02; H04R 5/00
USPC ............ 381/300, 80, 303, 304, 387, 306, 307
See application file for complete search history.

(56) References Cited

U.S. PATENT DOCUMENTS 8,243,961 B1    8/2012  Morrill
9,107,020 B2 *  8/2015  Betts-Lacroix ........... H04S 7/30
(Continued)

FOREIGN PATENT DOCUMENTS

CN          103167383       6/2013

OTHER PUBLICATIONS

International Search Report and Written Opinion from corresponding International Application No. PCT/IB2014/062996, mailed on Nov. 13, 2014.

*Primary Examiner* — Thjuan K Addy
(74) *Attorney, Agent, or Firm* — Renner, Otto, Boisselle & Sklar, LLP

(57) ABSTRACT

Method and apparatus for audio output, and electronic device. The method applies to the electronic device including first and second speakers at left and right sides of the device placed in a horizontal state, respectively, and third and fourth speakers at left and right sides of the device placed in a vertical state, respectively, the method including: detecting placement state of the device when it is under a speaker output mode; and switching, according to the placement state of the device, a stereo output and/or a bass output of audio data to be outputted to a speaker or speakers corresponding to the placement state, and outputting the audio data in the form of stereo output and/or bass output through the speaker or speakers corresponding to the placement state. Stereo output effect can be obtained when the device is in speaker output mode, regardless of whether placed horizontally or vertically.

20 Claims, 5 Drawing Sheets

(51) Int. Cl.
   *H04S 7/00* (2006.01)
   *H04R 3/12* (2006.01)
   *H04S 1/00* (2006.01)
   *H04M 1/725* (2006.01)
   *H04M 1/03* (2006.01)
(52) U.S. Cl.
   CPC .............. *H04S 1/002* (2013.01); *H04M 1/03* (2013.01); *H04M 2250/12* (2013.01); *H04R 2420/03* (2013.01); *H04R 2499/11* (2013.01)

(56) References Cited

U.S. PATENT DOCUMENTS

| | | |
|---|---|---|
| 2001/0011993 A1 | 8/2001 | Saarinen |
| 2006/0161278 A1 | 7/2006 | Maeda et al. |
| 2011/0316768 A1 | 12/2011 | McRae |
| 2012/0051567 A1 | 3/2012 | Castor-Perry |
| 2013/0028446 A1 | 1/2013 | Krzyzanowski |
| 2013/0129122 A1 | 5/2013 | Johnson et al. |
| 2013/0230186 A1 | 9/2013 | Li et al. |

* cited by examiner

METHOD AND APPARATUS FOR AUDIO OUTPUT, AND ELECTRONIC DEVICE

CROSS-REFERENCE TO RELATED APPLICATION AND PRIORITY CLAIM

Priority is claimed from Chinese patent application No. 201310544731.8, filed Nov. 6, 2013, and from PCT patent application No. PCT/IB/2014/062996, filed Jul. 10, 2014, the entire disclosures of which hereby are incorporated by reference.

TECHNICAL FIELD

The present invention relates to electronic devices, and particularly, to a method and an apparatus for audio output, and an electronic device.

BACKGROUND

With the rapid developments of the electronic technology and the communication technology, some electronic devices, such as mobile phones, have become indispensable parts of people's daily lives. They integrate many functions, and bring great conveniences to people's lives and works. One of the functions is to play audio data such as music or speeches through a stereo, which uses two or more independent sound effect channels and appears on a pair of speakers (e.g., horns) arranged symmetrically. The sound generated in such a method is kept natural and melodious in various directions.

SUMMARY

In some practical applications, a mobile phone having a stereo function only obtains the stereo output effect at a specific position (e.g., the horizontal position), and once the mobile phone is deviated from the specific position such as being rotated to another position (e.g., the vertical position), the output of the speakers is no longer stereophonic since the position of the speakers is changed.

To be noted, the above introduction to the technical background is just made for the convenience of clearly and completely describing the technical solutions of the present invention, and to facilitate the understanding of a person skilled in the art. It shall not be deemed that the above technical solutions are known to a person skilled in the art just because they have been illustrated in the Background section of the present invention.

The embodiments of the present invention provide a method and an apparatus for audio output, and an electronic device, so that the stereo output effect can be obtained when the electronic device is under a speaker output mode, regardless of whether the electronic device is placed in a horizontal position or a vertical position.

According to an aspect of the embodiments of the present invention, a method for audio output is provided, which is applicable to an electronic device, wherein the electronic device includes a first speaker, a second speaker, a third speaker and a fourth speaker, the first speaker and the second speaker disposed at the left and right sides of the electronic device placed in a horizontal state, respectively, and the third speaker and the fourth speaker disposed at the left and right sides of the electronic device placed in a vertical state, respectively, the method including:

detecting a placement state of the electronic device when the electronic device is under a speaker output mode; and switching, according to the placement state of the electronic device, a stereo output and/or a bass output of audio data to be outputted to a speaker (or speakers) corresponding to the placement state of the electronic device, and outputting the audio data in the form of stereo output and/or bass output through the speaker(s) corresponding to the placement state of the electronic device.

According to another aspect of the embodiments of the present invention, when the electronic device is placed in the horizontal state, a first stereo output of the audio data is switched to the first speaker, and a second stereo output of the audio data is switched to the second speaker, so as to output the audio data in the form of stereo output through the first speaker and the second speaker.

According to another aspect of the embodiments of the present invention, when the electronic device is placed in the horizontal state, a bass output of the audio data is switched to the third speaker and/or the fourth speaker, so as to output the audio data in the form of bass output through the third speaker and/or the fourth speaker.

According to another aspect of the embodiments of the present invention, when the electronic device is placed in the vertical state, a first stereo output of the audio data is switched to the third speaker, and a second stereo output of the audio data is switched to the fourth speaker, so as to output the audio data in the form of stereo output through the third speaker and the fourth speaker.

According to another aspect of the embodiments of the present invention, when the electronic device is placed in the vertical state, a bass output of the audio data is switched to the first speaker and/or the second speaker, so as to output the audio data in the form of bass output through the first speaker and/or the second speaker.

According to another aspect of the embodiments of the present invention, the method further includes:

adjusting audio parameters according to the placement state of the electronic device; and determining the stereo output and/or the bass output of the audio data according to the adjusted audio parameters.

According to another aspect of the embodiments of the present invention, the method further includes:

switching a handset output of acquired audio data to the first speaker, the second speaker, the third speaker or the fourth speaker when the electronic device is under a handset output mode, and outputting the acquired audio data through the first speaker, the second speaker, the third speaker or the fourth speaker.

According to another aspect of the embodiments of the present invention, the method further includes:

detecting distances from the first speaker, the second speaker, the third speaker and the fourth speaker to an ear respectively when the electronic device is under a handset output mode, and determining a speaker closest to the ear; and switching a handset output of acquired audio data to the speaker closest to the ear, and outputting the acquired audio data through the speaker closest to the ear.

According to another aspect of the embodiments of the present invention, an apparatus for audio output is provided, which is included in an electronic device, wherein the electronic device further includes a first speaker, a second speaker, a third speaker and a fourth speaker, the first speaker and the second speaker disposed at the left and right sides of the electronic device placed in a horizontal state, respectively, and the third speaker and the fourth speaker disposed at the left and right sides of the electronic device placed in a vertical state, respectively, the apparatus including:

a detection unit configured to detect a placement state of the electronic device when the electronic device is under a speaker output mode;

a switching unit configured to switch a stereo output and/or a bass output of audio data to be outputted to a speaker (or speakers) corresponding to the placement state of the electronic device, according to the placement state of the electronic device detected by the detection unit; and an output unit configured to output the audio data in the form of stereo output and/or bass output through the speaker(s) corresponding to the placement state of the electronic device.

According to another aspect of the embodiments of the present invention, when the electronic device is placed in the horizontal state, the switching unit switches a first stereo output of the audio data to the first speaker, and switches a second stereo output of the audio data to the second speaker;

the output unit outputs the audio data in the form of stereo output through the first speaker and the second speaker.

According to another aspect of the embodiments of the present invention, when the electronic device is placed in the horizontal state, the switching unit switches a bass output of the audio data to the third speaker and/or the fourth speaker;

the output unit outputs the audio data in the form of bass output through the third speaker and/or the fourth speaker.

According to another aspect of the embodiments of the present invention, when the electronic device is placed in the vertical state, the switching unit switches a first stereo output of the audio data to the third speaker, and switches a second stereo output of the audio data to the fourth speaker;

the output unit outputs the audio data in the form of stereo output through the third speaker and the fourth speaker.

According to another aspect of the embodiments of the present invention, when the electronic device is placed in the vertical state, the switching unit switches a bass output of the audio data to the first speaker and/or the second speaker;

the output unit outputs the audio data in the form of bass output through the first speaker and/or the second speaker.

According to another aspect of the embodiments of the present invention, the apparatus further includes:

a control unit configured to adjust audio parameters according to the placement state of the electronic device detected by the detection unit, and determine the stereo output and/or the bass output of the audio data according to the adjusted audio parameters.

According to another aspect of the embodiments of the present invention, when the electronic device is under a handset output mode, the switching unit switches a handset output of acquired audio data to the first speaker, the second speaker, the third speaker or the fourth speaker;

the output unit outputs the acquired audio data through the first speaker, the second speaker, the third speaker or the fourth speaker.

According to another aspect of the embodiments of the present invention, when the electronic device is under a handset output mode, the detection unit detects distances from the first speaker, the second speaker, the third speaker and the fourth speaker to an ear respectively, and determine a speaker closest to the ear;

the switching unit switches a handset output of acquired audio data to the speaker closest to the ear;

the output unit outputs the acquired audio data through the speaker closest to the ear.

According to another aspect of the embodiments of the present invention, an electronic device is provided, wherein the electronic device includes:

a first speaker, a second speaker, a third speaker and a fourth speaker, the first speaker and the second speaker disposed at the left and right sides of the electronic device placed in a horizontal state, respectively, and the third speaker and the fourth speaker disposed at the left and right sides of the electronic device placed in a vertical state, respectively; and the apparatus for audio output aforementioned.

According to another aspect of the embodiments of the present invention, the first speaker and the second speaker are disposed in the same horizontal line at the left and right sides of the electronic device placed in the horizontal state, respectively, and the third speaker and the fourth speaker are disposed in the same horizontal line at the left and right sides of the electronic device placed in the vertical state, respectively.

According to another aspect of the embodiments of the present invention, the first speaker, the second speaker, the third speaker and/or the fourth speaker include(s) a plurality of speakers.

The embodiments of the present invention have the following beneficial effect: the stereo output effect can be obtained by setting the speakers at the four sides of the electronic device, respectively, and starting different speakers when the electronic device is at different positions, once the stereo play function is activated, i.e., the electronic device is under the speaker output mode, regardless of whether the electronic device is at the horizontal position or the vertical position.

With reference to the subsequent descriptions and drawings, the embodiments of the present invention are disclosed to indicate the implementations of the principles of the present invention. It shall be appreciated that the scope of embodiments of the present invention is not limited thereto. The embodiments of the present invention include many changes, modifications and equivalents within the scope of the spirit and the provisions of the accompanied claims.

Features described and/or illustrated with respect to one embodiment can be used in one or more other embodiments in a same or similar way, and/or by being combined with or replacing the features in other embodiments.

To be noted, the term "comprise/include" used herein specifies the presence of feature, element, step or component, not excluding the presence or addition of one or more other features, elements, steps or components.

BRIEF DESCRIPTION OF THE DRAWINGS

The included drawings are provided for further understanding of the embodiments of the present invention, and they constitute a part of the Specification. The drawings illustrate the embodiments of the present invention, and explain the principles of the present invention together with the text. It should be noted that the following drawings just illustrate some embodiments of the present invention, and a person skilled in the art can obtain other drawings from those drawings without paying any creative effort.

In which.

DESCRIPTION OF THE EMBODIMENTS

The interchangeable terms "electronic device" and "electronic apparatus" include a portable radio communication device. The term "portable radio communication device", which is hereinafter referred to as "mobile radio terminal", "portable electronic apparatus", or "portable communication apparatus", includes all devices such as mobile phone, pager, communication apparatus, electronic organizer, personal digital assistant (PDA), smart phone, portable communication apparatus, etc.

In the present application, the embodiments of the present invention are mainly described with respect to a portable electronic apparatus in the form of a mobile phone (also referred to as "cellular phone"). However, it shall be appreciated that the present invention is not limited to the case of the mobile phone and it may relate to any type of appropriate electronic device, such as media player, gaming device, PDA, computer, digital camera, etc.

The preferred embodiments of the present invention are described as follows with reference to the drawings.

Embodiment 1

Figure 1:
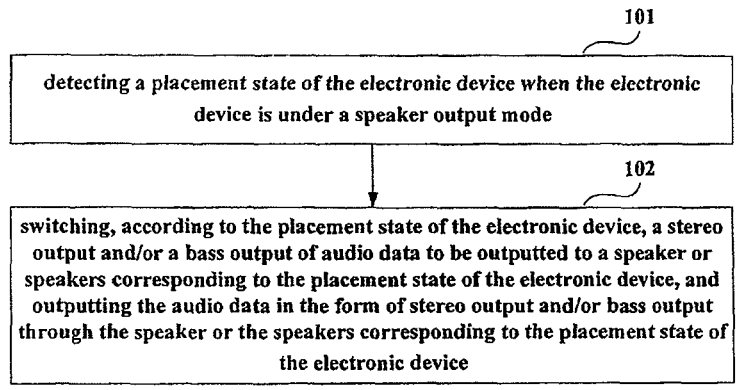
FIG. 1 is a flowchart of an implementation of a method for audio output in Embodiment 1 of the present invention.

Embodiment 1 of the present invention provides a method for audio output applicable to an electronic device, wherein the electronic device includes a first speaker, a second speaker, a third speaker and a fourth speaker, the first speaker and the second speaker disposed at the left and right sides of the electronic device placed in a horizontal state, respectively, and the third speaker and the fourth speaker disposed at the left and right sides of the electronic device placed in a vertical state, respectively. FIG. 1 is a flowchart of an implementation of a method for audio output in Embodiment 1 of the present invention. As illustrated in FIG. 1, the method including:

Step 101: detecting a placement state of the electronic device when the electronic device is under a speaker output mode;

Step 102: switching, according to the placement state of the electronic device, a stereo output and/or a bass output of audio data to be outputted to a speaker (or speakers) corresponding to the placement state of the electronic device, and outputting the audio data in the form of stereo output and/or bass output through the speaker(s) corresponding to the placement state of the electronic device.

Herein, the audio data to be outputted may be a music file pre-stored in the electronic device, an audio file in the Internet, etc., but the embodiment is not limited thereto.

In the embodiment, the electronic device may be a smart phone, a tablet PC, etc., but the present invention is not limited thereto. The electronic device includes a first speaker, a second speaker, a third speaker and a fourth speaker. The embodiment is just described taking that the first speaker and the second speaker are disposed at the left and right sides of the electronic device placed in the horizontal state, respectively, and the third speaker and the fourth speaker are disposed at the left and right sides of the electronic device placed in the vertical state, respectively as an example. But the embodiment is not limited thereto.

In the embodiment, the user may start the speaker output mode by operating the audio play button (or the virtual key). When the electronic device is under the speaker output mode, the placement state of the electronic device may be detected in step 101 of the embodiment, including detecting whether the electronic device is in the horizontal state or the vertical state. The detection may be realized through existing means, and herein is not described.

The horizontal state and the vertical state are not absolute. For example, when it is detected that the vertical sides of the electronic device are deviated from the gravity center line for a predetermined angle, the electronic device is still deemed as being in the horizontal state. Herein the predetermined angle may be set upon demand, and usually less than 45 degrees. Similarly, when it is detected that the horizontal sides of the electronic device are deviated from the gravity center line for a predetermined angle, the electronic device is still deemed as being in the vertical state. Herein the predetermined angle may be set upon demand, and usually less than 45 degrees. Herein the horizontal sides of the electronic device are two sides perpendicular to the gravity center line when the electronic device is in the horizontal state, and the vertical sides of the electronic device are two sides parallel with the gravity center line when the electronic device is in the horizontal state.

The embodiment is not limited to starting to detect the placement state of the electronic device only when the electronic device is under the speaker output mode. In other embodiments, the detection of the placement state of the electronic device applied to the rotation of the display screen may be used, e.g., once the user activates the automatic rotation function, the detection of the placement state of the electronic device is started. On one hand, the rotation of the display screen is controlled according to the detection result. On the other hand, once it is detected that the electronic device is under the speaker output mode, the detection result of the placement state of the electronic device is used for the speaker switching.

In one embodiment, in step 102, when the electronic device is placed in the horizontal state, the first stereo output of the audio data is switched to the first speaker, and the second stereo output of the audio data is switched to the second speaker, so as to output the audio data in the form of stereo output through the first speaker and the second speaker. Since the first speaker and the second speaker are disposed at the left and right sides of the electronic device placed in the horizontal state, the distances from the two speakers to corresponding ears of the user are similar to each other in that state, thus the user can obtain the stereo effect.

In one implementation of the embodiment, the first stereo may be an output of a stereo left channel of the audio data, and correspondingly, the second stereo may be an output of a stereo right channel of the audio data. Of course, the embodiment is not limited thereto. For example, the first stereo may be an output of the stereo right channel of the audio data, and correspondingly, the second stereo may be an output of the stereo left channel of the audio data.

Figure 2A:
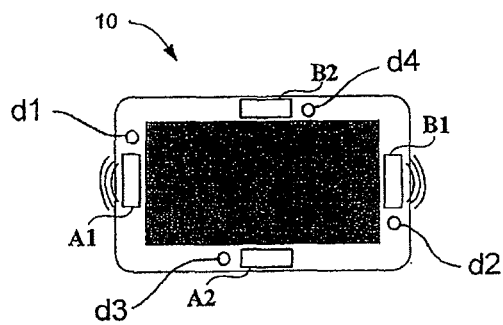
FIGS. 2A, 2B and 2C are similar schematic diagrams where an electronic device in Embodiment 1 is placed in a horizontal state.

The electronic device 10 illustrated in FIG. 2A is taken as an example. In the example of FIG. 2A, the electronic device is placed in the horizontal state. When the user activates the audio play function, the speaker output mode is started. In that case, according to the method of the embodiment, the speakers A1 and B1 (e.g., sometimes referred to, without limitation, as the first and second speakers, respectively) at the left and right sides of the electronic device placed in the horizontal state are activated, so that the user can obtain the stereo effect of the audio data.

Figure 2B:
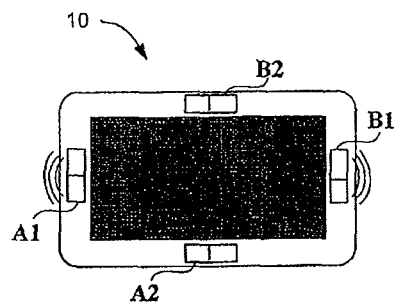
Figure 2C:
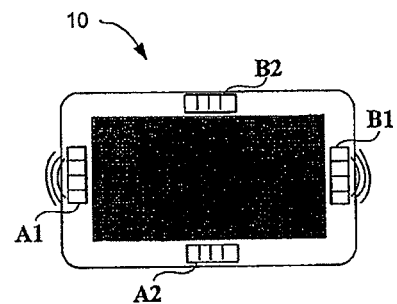

Briefly referring to FIGS. 2B and 2C, it will be seen that one or more of the first speaker A1, second speaker B1, third speaker A2, and/or fourth speaker B2 may be composed of more than one speaker, the two illustrated examples being as two speakers shown in FIG. 2B or as four speakers shown in FIG. 2C, but the number may be three, five or any other number of speakers, as may be desired.

In the implementation, when the first stereo output of the audio data is switched to the first speaker, and the second stereo output of the audio data is switched to the second speaker, the method may further include: switching the bass output of the audio data to the third speaker and/or the fourth speaker (e.g., sometimes referred to as speakers A2 and B2, respectively), and outputting the audio data in the form of bass output through the third speaker and/or the fourth speaker. Thus, the bass effect can be obtained in addition to the stereo effect of the audio data, thereby further improving the user experience.

The electronic device illustrated in FIG. 2A is still taken as an example. When the audio data is outputted in the form of stereo output through the speakers A1 and B1, it also can be outputted in the form of bass output through the speaker(s) A2 and/or B2. Thus, the user obtains the bass effect in addition to the stereo effect of the audio data.

In another implementation, in step 102, when the electronic device 10 is placed in the vertical state, the first stereo output of the audio data is switched to the third speaker, e.g., A2, and the second stereo output of the audio data is switched to the fourth speaker, e.g., B2, so as to output the audio data in the form of stereo output through the third speaker and the fourth speaker. Since the third speaker and the fourth speaker are disposed at the left and right sides of the electronic device placed in the vertical state, the distances from the two speakers to corresponding ears of the user are similar to each other in that state, thus the user can obtain the stereo effect.

Figure 3:
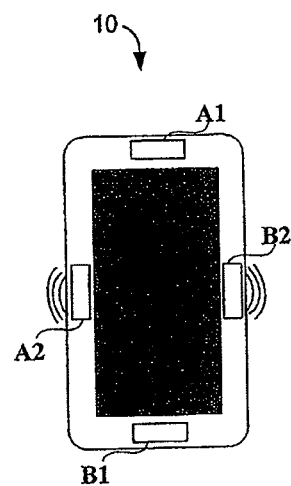
FIG. 3 is a schematic diagram where an electronic device in Embodiment 1 is placed in a vertical state.

The electronic device 10 illustrated in FIG. 3 is taken as an example. In the example of FIG. 3, the electronic device is placed in the vertical state. When the user activates the audio play function, the speaker output mode is started. In that case, according to the method of the embodiment, the speakers A2 and B2 at the left and right sides of the electronic device placed in the vertical state are activated, so that the user can obtain the stereo effect of the audio data.

In the implementation, when the first stereo output of the audio data is switched to the third speaker, e.g., A2, and the second stereo output of the audio data is switched to the fourth speaker, e.g., B2, the method may further include: switching the bass output of the audio data to the first speaker, e.g., A1, and/or the second speaker, e.g., B1, and outputting the audio data in the form of bass output through the first speaker and/or the second speaker. Thus, the bass effect can be obtained in addition to the stereo effect of the audio data, thereby further improving the user experience.

The electronic device 10 illustrated in FIG. 3 is still taken as an example. When the audio data is outputted in the form of stereo output through the speakers A2 and B2, it also can be outputted in the form of bass output through the speaker(s) A1 and/or B1. Thus, the user obtains the bass effect in addition to the stereo effect of the audio data.

As can be seen from the above method of the embodiment, the stereo output effect can be obtained by setting the speakers at the four sides of the electronic device, respectively, and starting different speakers when the electronic device is at different positions (the term positions sometimes may be referred to equivalently as states, orientations or positional relationships of the respective speakers, for example), once the stereo play function is activated, i.e., the electronic device is under the speaker output mode, regardless of whether the electronic device is at the horizontal position or the vertical position.

In another implementation, in order to improve and enrich the audio effect of the stereo/bass output, the method may further include:

adjusting audio parameters according to the placement state of the electronic device;

determining the stereo output and/or the bass output of the audio data according to the adjusted audio parameters.

Herein the audio parameters are those used for adjusting the audio effect, including, but not limited to, the frequency parameter. Adjusting the audio parameters according to different placement states of the electronic device include, for example, adjusting the audio parameters to be suitable for the stereo output and/or the bass output in the vertical state when it is detected that the electronic device is placed in the vertical state, and adjusting the audio parameters to be suitable for the stereo output and/or the bass output in the horizontal state when it is detected that the electronic device is placed in the horizontal state; or adjusting different audio parameters according to the placement states of the electronic device, so as to output different stereo or bass effects when the electronic device is in different placement states. Herein the audio parameters can be arbitrarily adjusted according to the actual requirement, and the embodiment is not limited thereto.

In the implementation, any manner in the prior art may be adopted to adjust the stereo output and/or bass output of the audio data according to different audio parameters, and herein is omitted.

In another implementation, if it is detected that the electronic device is under a handset output mode, the method may further include:

switching a handset output of acquired audio data to the first speaker, the second speaker, the third speaker or the fourth speaker, and outputting the acquired audio data through the first speaker, the second speaker, the third speaker or the fourth speaker.

Herein the audio data may be the sound of the opposite side in the conversation acquired by listening to the phone call, an audio file pre-stored by the electronic device, an audio file acquired through a speech transmission, etc., and the embodiment is not limited thereto.

In the implementation, a speaker corresponding to the handset output may be preset, for example at least one of the above four speakers. When the electronic device is under the handset output mode, the audio data to be outputted is outputted under the handset output mode through the preset speaker. The preset speaker may be any one or several of the above four speakers, and the embodiment is not limited thereto.

In another implementation, when it is detected that the electronic device is in a handset output mode, since the phone call is usually listened to through the user's ear, the speaker closest to the user's ear may be started by detecting the distances from various speakers to the user's ear, thereby improving the flexibility of listening to the phone call. Thus in the implementation, the method further including:

when the electronic device is under the handset output mode, detecting distances from the first speaker, the second speaker, the third speaker and the fourth speaker to the ear, respectively, and determining a speaker closest to the ear; and switching a handset output of acquired audio data to the speaker closest to the ear, and outputting the acquired audio data through the speaker closest to the ear. For example, the detection may be performed through a distance sensor.

For example, distance sensors d1, d2, d3, d4, respectively, may be included in the speakers (e.g., A1, B1, A2, B2), for example, or may be one or more separate distance sensors separate from the speakers, to acquire detection information, as is illustrated, for example, in FIG. 2A. The detection information may be used for indicating the distance between each speaker and the ear. A comparison of the detection information may be made to determine which speaker is closest to a given ear of the user. After it is determined according to the comparison between/among the detection information that one of the speakers is closest to the ear, the electronic equipment switches the handset output of the acquired audio data to that speaker, and outputs the acquired audio data through that speaker. If a different speaker is determined to be the closest to the ear of the user, then the electronic equipment switches to send audio data the different speaker, e.g., in a case that the user moves the electronic device. The distance sensor(s) may be realized through existing means, and herein is not described. The comparisons made and switching of signals mentioned may be carried out under appropriate computer program code operating via the memory 140 and CPU 100 described further below.

Figure 4:
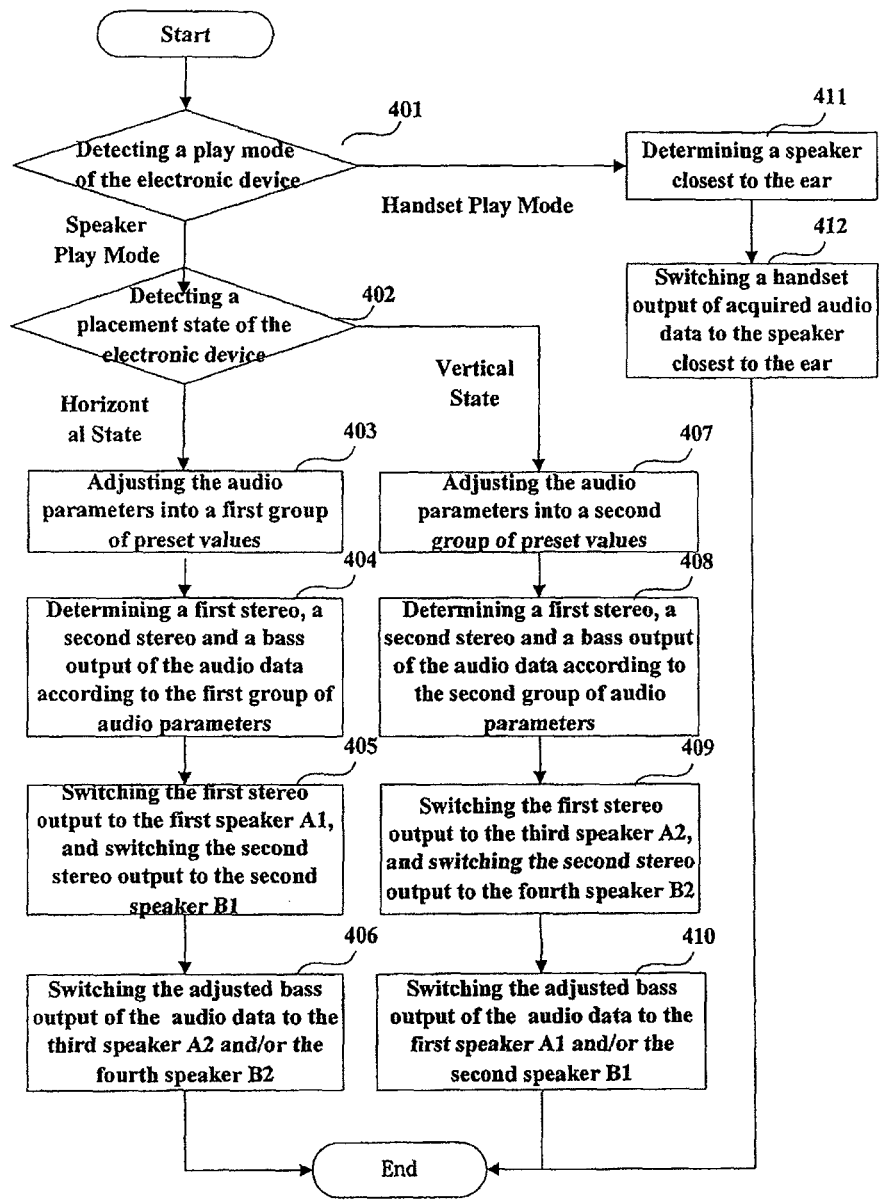
FIG. 4 is a flowchart of another implementation of a method for audio output in Embodiment 1 of the present invention.

FIG. 4 is a flowchart of another implementation of a method for audio output in the embodiment of the present invention. The implementation is just schematic, and the embodiment of the present invention is not limited thereto. For example, in the implementation of FIG. 4, some steps may be omitted, and some steps may be replaced by others as mentioned before, which are omitted herein.

As illustrated in FIG. 4, the method including:

Step 401: detecting an output mode (also referred to as a play mode) of the electronic device, and performing step 402 when the electronic device is under the speaker output (or play) mode, or performing step 411 when the electronic device is under the handset output (or play) mode;

Step 402: detecting a placement state of the electronic device, and performing step 403 when the electronic device is placed in a horizontal state, or performing step 407 when the electronic device is placed in a vertical state;

Step 403: adjusting the audio parameters into a first group of preset values;

Step 404: determining a first stereo, a second stereo and a bass output of the audio data according to the first group of audio parameters;

Step 405: switching the adjusted first stereo output of the audio data to the first speaker A1, and switching the adjusted second stereo output of the audio data to the second speaker B1;

Step 406: switching the adjusted bass output of the audio data to the third speaker A2 and/or the fourth speaker B2;

In the above implementation, steps 403-404 and 406 can be omitted. In addition, the orders of steps 405 and 406 can be exchanged, e.g., step 406 may be performed before step 405.

Step 407: adjusting the audio parameters into a second group of preset values;

Step 408: determining a first stereo, a second stereo and a bass output of the audio data according to the second group of audio parameters;

Step 409: switching the adjusted first stereo output of the audio data to the third speaker A2, and switching the adjusted second stereo output of the audio data to the fourth speaker B2;

Step 410: switching the adjusted bass output of the audio data to the first speaker A1 and/or the second speaker B1;

In the above implementation, steps 407-408 and 410 can be omitted. In addition, the orders of steps 409 and 410 can be exchanged, e.g., step 410 may be performed before step 409.

Step 411: detecting the distances from the first speaker A1, the second speaker B1, the third speaker A2 and the fourth speaker B2 to the ear respectively, and determining a speaker closest to the ear, for example, as is described above with respect to distance sensors d1-d4 and associated operation.

Step 412: switching a handset output of acquired audio data to the speaker closest to the ear.

In the above implementation, step 411 may be omitted. In that case, the handset output of the acquired audio data is switched to the preset speaker directly in step 412.

In the embodiment, the first and second groups of preset values of the audio parameters may be arbitrarily set according to the actual requirement, and the embodiment is not limited thereto. It shall be noted that FIG. 4 only illustrates an example where the electronic device is placed in the vertical or horizontal state, and the present invention is not limited thereto. In addition, the speaker switching mode in FIG. 4 is also not limited thereto. Moreover, steps 403, 404, 406~408 and 410~412 for example may be omitted, and the specific implementation can be determined according to the actual condition or actual requirements, e.g., as desired or required for the current conditions or implementation.

As can be seen from the above method of the embodiment, the stereo output effect can be obtained by setting the speakers at the four sides of the electronic device, respectively, and starting different speakers when the electronic device is at different positions (e.g., also referred to as orientations or states), once the stereo play function is activated, i.e., the electronic device is under the speaker output mode, regardless of whether the electronic device is at the horizontal position or the vertical position. In addition, an optimum stereo output effect can be obtained by adjusting the audio parameters.

Embodiment 2

Embodiment 2 of the present invention further provides an audio output apparatus included in an electronic device. The electronic device further includes a first speaker, a second speaker, a third speaker and a fourth speaker, the first speaker and the second speaker disposed at the left and right sides of the electronic device placed in a horizontal state, respectively, and the third speaker and the fourth speaker disposed at the left and right sides of the electronic device placed in a vertical state, respectively. As the principle of the apparatus for solving problems is similar to that of the method in Embodiment 1, the implementation of the method may be referred to for the implementation of the apparatus, e.g., as described above with respect to the device 10 of FIGS. 1 and 2, and the repeated parts shall not be described any further.

Figure 5:
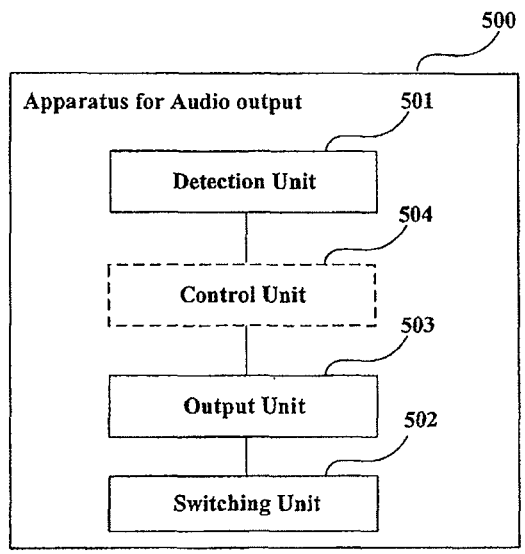
FIG. 5 is a schematic structure diagram of an apparatus for audio output in Embodiment 2 of the present invention.

FIG. 5 is a schematic structure diagram of an apparatus for audio output in Embodiment 2 of the present invention. As illustrated in FIG. 5, the apparatus including: a detection unit 501, a switching unit 502 and an output unit 503, wherein, the detection unit 501 is configured to detect a placement state of the electronic device when the electronic device is under a speaker output mode (for example, the detection unit may include one or more conventional accelerometers or other devices and conventional circuitry, computer code in memory 140 for operating the CPU 100, and so on, that detect orientation of the electronic device, e.g., is it in horizontal or vertical state shown in FIG. 2A or 3 or in some other placement state);

the switching unit 502 is configured to switch a stereo output and/or a bass output of audio data to be outputted to a speaker (or speakers) corresponding to the placement state of the electronic device, according to the placement state of the electronic device detected by the detection unit 501; and the output unit 503 is configured to output the audio data in the form of stereo output and/or bass output through the speaker(s) corresponding to the placement state of the electronic device.

In one implementation of the embodiment, the switching unit 502 switches a first stereo output of the audio data to the first speaker, and switches a second stereo output of the audio data to the second speaker, when the electronic device is placed in the horizontal state. The output unit 503 outputs the audio data in the form of stereo output through the first and second speakers.

In one implementation of the embodiment, the switching unit 502 switches a bass output of the audio data to the third speaker and/or the fourth speaker, when the electronic device is placed in the horizontal state. The output unit 503 outputs the audio data in the form of bass output through the third speaker and/or the fourth speaker.

In one implementation of the embodiment, the switching unit 502 switches the first stereo output of the audio data to the third speaker, and switches the second stereo output of the audio data to the fourth speaker, when the electronic device is placed in the vertical state. The output unit 503 outputs the audio data in the form of stereo output through the third and fourth speakers.

In one implementation of the embodiment, the switching unit 502 switches the bass output of the audio data to the first speaker and/or the second speaker, when the electronic device is placed in the vertical state. The output unit 503 outputs the audio data in the form of bass output through the first speaker and/or the second speaker.

In the embodiment, in order to improve and enrich the audio effect of the stereo/bass output, the apparatus may further include:

a control unit 504 (optional) configured to adjust audio parameters according to the placement state of the electronic device detected by the detection unit 501, and determine the stereo output and/or the bass output of the audio data according to the adjusted audio parameters.

Herein the audio parameters are those used for adjusting the audio effect, including, but not limited to, the frequency parameter. Adjusting the audio parameters according to different placement states of the electronic device may include, for example, adjusting the audio parameters to be suitable for the stereo output and/or the bass output in the vertical state when it is detected that the electronic device is placed in the vertical state, and adjusting the audio parameters to be suitable for the stereo output and/or the bass output in the horizontal state when it is detected that the electronic device is placed in the horizontal state; or adjusting different audio parameters according to the placement states of the electronic device, so as to output different stereo or bass effects when the electronic device is in different placement states. Herein the audio parameters can be arbitrarily adjusted according to the actual requirement, and the embodiment is not limited thereto.

In the embodiment, any manner in the prior art may be adopted to adjust the stereo output and/or bass output of the audio data according to different audio parameters, and herein is omitted.

In the embodiment, the first speaker and the second speaker are disposed at the left and right sides of the electronic device placed in the horizontal state, respectively, and the third speaker and the fourth speaker are disposed at the left and right sides of the electronic device placed in the vertical state, respectively. But the embodiment is not limited thereto. Optionally, the first speaker and the second speaker are disposed in the same horizontal line at the left and right sides of the electronic device placed in the horizontal state, respectively, and the third speaker and the fourth speaker are disposed in the same horizontal line at the left and right sides of the electronic device placed in the vertical state, respectively.

In the embodiment, in order to obtain a better stereo effect, each speaker may include a plurality of speakers, that is, the first speaker, the second speaker, the third speaker and the fourth speaker may be a speaker group which may include a plurality of speakers respectively.

In one implementation of the embodiment, the switching unit 502 switches a handset output of acquired audio data to the first speaker, the second speaker, the third speaker or the fourth speaker, when the electronic device is under handset output mode. The output unit 503 outputs the acquired audio data through the first speaker, the second speaker, the third speaker or the fourth speaker.

In another implementation of the embodiment, when the electronic device is under the handset output mode, the detection unit 501 detects the distances from the first speaker, the second speaker, the third speaker and the fourth speaker to the ear respectively, and determines a speaker closest to the ear. The switching unit 502 switches a handset output of acquired audio data to the speaker closest to the ear. The output unit 503 outputs the acquired audio data through the speaker closest to the ear. Thus, the detection unit 501 may include the sensors d1, d2, d3, d4, which are described above, to determine which speaker is closest to the ear of a user or may include one or more other sensors to detect the distance information and, thus, closest ear-speaker relation, e.g., using operation of the output unit 503 and/or of the appropriate software code in memory 140 carrying out operation of the CPU 100, as described above.

In the embodiment, the apparatus for audio output may further include other units, such as a power amplifier, a switch and an encoder, which can be set arbitrarily according to the actual requirement, conditions in the local environment, functions to be carried out as desired, and so on, and the embodiment is not limited thereto. The power amplifier may be used to amplify signals at the final amplification stage in an apparatus for audio output, e.g., to give the required audio power output, as may be needed and as is known, for example. A switch or switch mechanism may be used to switch the stereo output of audio data to be outputted to one or more respective speakers according to the placement or orientation of the electronic device, for example. An encoder may be used to convert audio data to a specific format, for example.

Figure 6:
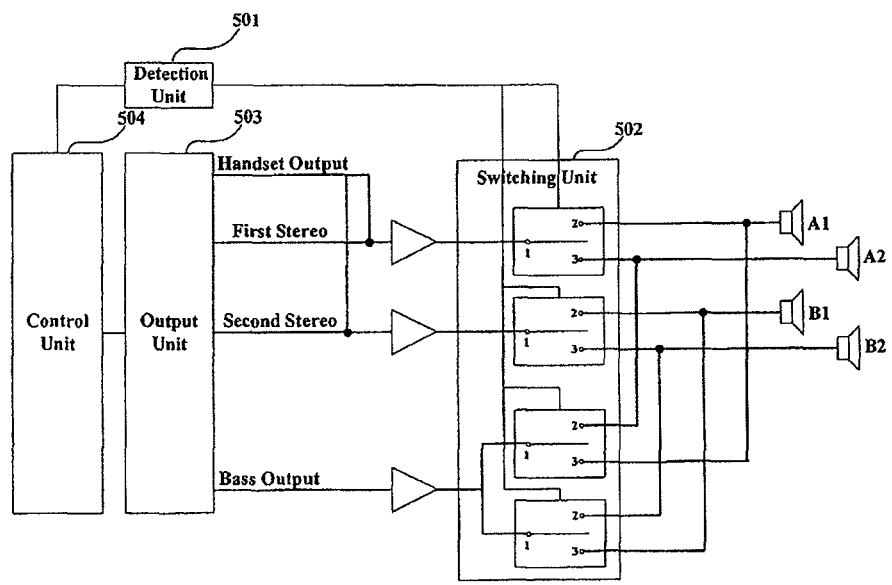
FIG. 6 is a schematic diagram of an implementation of an apparatus for audio output in Embodiment 2 of the present invention.

FIG. 6 is a schematic diagram of an internal structure of the apparatus for audio output in FIG. 5 of the embodiment of the present invention. The electronic device includes a first speaker A1 and a second speaker B1 disposed at the left and right sides of the electronic device placed in a horizontal state, respectively, and a third speaker A2 and a fourth speaker B2 disposed at the left and right sides of the electronic device placed in a vertical state, respectively, which is just an example, and the embodiment is not limited thereto.

In the embodiment, the detection unit 501 detects a placement state of the electronic device when the electronic device is under a speaker output mode. In the embodiment, when the detection unit 501 detects that the electronic device is placed in the horizontal state, the switching unit 502 turns on switches 1 and 2, while the output unit 503 outputs a first stereo of the audio data through the first speaker A1, and outputs a second stereo of the audio data through the second speaker B1. Optionally, the output unit 503 outputs the bass of the audio data through the third speaker A2 and/or the fourth speaker B2.

In the embodiment, when the detection unit 501 detects that the electronic device is placed in the vertical state, the switching unit 502 turns on switches 1 and 3, while the output unit 503 outputs the first stereo of the audio data through the third speaker A2, and outputs the second stereo of the audio data through the fourth speaker B2. Optionally, the output unit 503 outputs the bass of the audio data through the first speaker A1 and/or the second speaker B1.

Thus, the output unit 503 outputs the audio data in the form of stereo output and/or bass output through the speakers selected by the switching unit 502.

The control unit 504 adjusts audio parameters according to the placement state of the electronic device detected by the detection unit 501. The output unit 503 determines the stereo output and/or the bass output of the audio data according to the adjusted audio parameters.

In one implementation, the switching unit 502 switches the handset output of the acquired audio data to the first speaker A1, the second speaker B1, the third speaker A2 or the fourth speaker B2 by turning on switches 1-2 or 1-3, when the electronic device is under the handset output mode. The output unit 503 outputs the acquired audio data through the first speaker A1, the second speaker B1, the third speaker A2 or the fourth speaker B2.

In another implementation, when the electronic device is under the handset output mode, the detection unit 501 detects the distances from the first speaker, the second speaker, the third speaker and the fourth speaker to the ear respectively, and determines a speaker closest to the ear. The switching unit 502 switches the handset output of the acquired audio data to the speaker closest to the ear by turning on any of switches 1-2 or 1-3. The output unit 503 outputs the acquired audio data through the speaker closest to the ear.

As can be seen from the above apparatus of the embodiment, the stereo output effect can be obtained by setting the speakers at the four sides of the electronic device, respectively, and starting different speakers when the electronic device is at different positions, once the stereo play function is activated, i.e., the electronic device is under the speaker output mode, regardless of whether the electronic device is at the horizontal position or the vertical position. In addition, an optimum stereo output effect can be obtained by adjusting the audio parameters.

Embodiment 3

Embodiment 3 of the present invention provides an electronic device, including a first speaker, a second speaker, a third speaker and a fourth speaker. The electronic device further includes the apparatus for audio output in Embodiment 2, which is omitted herein since it has been described in details in Embodiment 2.

In the embodiment, optionally, as illustrated in FIGS. 2 and 3, the first speaker and the second speaker are disposed at the left and right sides of the electronic device, such as, for example, a device similar to the device 10 illustrated in FIGS. 2 and 3, placed in a horizontal state, respectively, and the third speaker and the fourth speaker are disposed at the left and right sides of the electronic device placed in a vertical state, respectively. But the embodiment is not limited thereto.

In the embodiment, optionally, as illustrated in FIGS. 2 and 3, the first speaker and the second speaker are disposed in the same horizontal line at the left and right sides of the electronic device placed in the horizontal state, respectively, and the third speaker and the fourth speaker are disposed in the same horizontal line at the left and right sides of the electronic device placed in the vertical state, respectively. But the embodiment is not limited thereto.

In which, the first speaker, the second speaker, the third speaker and/or the fourth speaker may include a plurality of speakers. But the embodiment is not limited thereto.

In the embodiment, the electronic device may be a mobile terminal. But the embodiment is not limited thereto.

Figure 7:
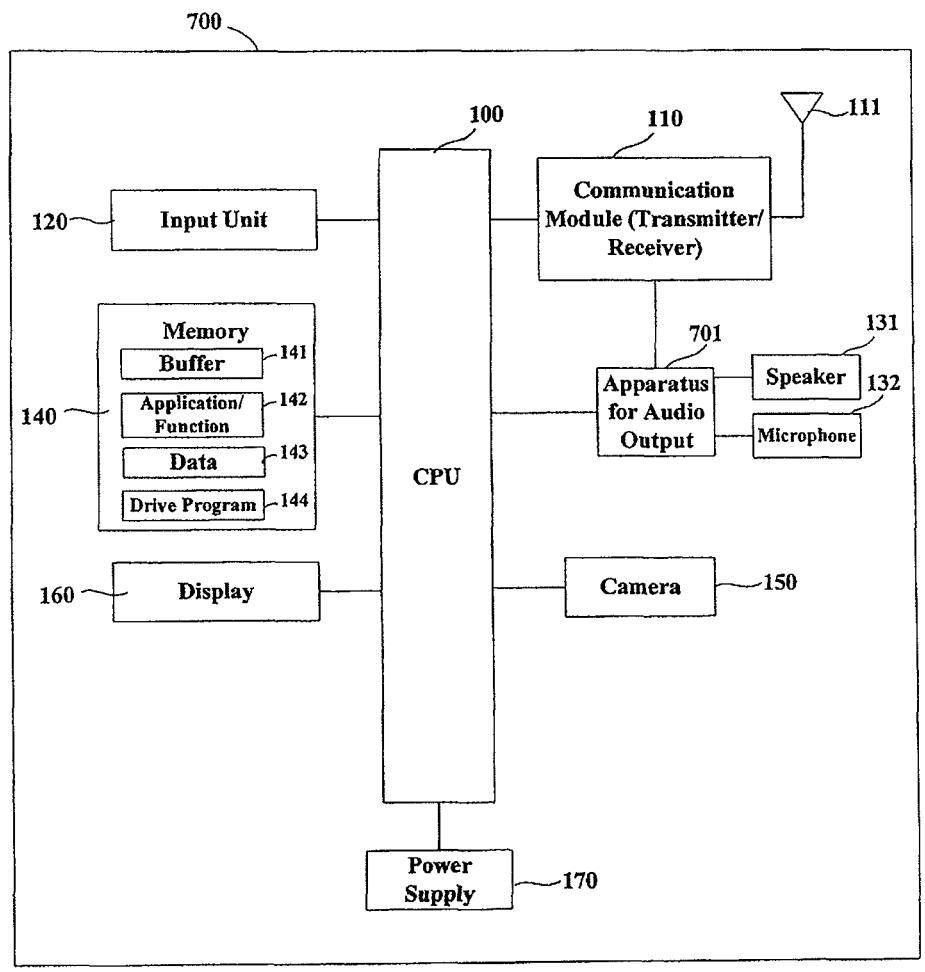
FIG. 7 is a schematic block diagram of a system structure of an electronic device in Embodiment 3 of the present invention.

FIG. 7 is a schematic block diagram of a system structure of an electronic device 700 in Embodiment 3 of the present invention. As illustrated in FIG. 7, in addition to the original compositions and functions, the electronic device 700 further includes an apparatus 701 for audio output which may be connected to a Central Processing Unit (CPU) 100, and which may be the apparatus 500 for audio output in Embodiment 2. To be noted, the diagram is just schematic, and the structure may be supplemented or replaced with other type of structure to realize the telecom or other function. Next, only some conventional compositions and functions of the electronic device 700 are introduced.

As illustrated in FIG. 7, in addition to the apparatus 701 for audio output, the electronic device 700 may further include a CPU 100, a communication module 110, an input unit 120, a memory 140, a camera 150, a display 160 and a power supply 170.

The CPU 100 (sometimes referred to as a controller or an operation control, including a microprocessor or other processor unit and/or logic unit) receives an input and controls various parts and operations of the electronic device 700.

The input unit 120 provides an input to the CPU 100. The input unit 120 for example may be a key or touch input means.

The camera 150 captures image data, and provides the captured image data to the CPU 100 for a conventional usage, such as storage, transmission, etc.

The power supply 170 supplies power to the electronic device 700.

The display 160 displays a display object such as an image, a text, etc. The display for example may be, but not limited to, an LCD display.

The memory 140 is coupled to the CPU 100. The memory 140 may be a solid state memory, such as Read Only Memory (ROM), Random Access Memory (RAM), SIM card, etc., and it also may be a memory which stores information even if the power is off, and which is selectively erasable and provided with more data. The example of the memory sometimes is referred to as EPROM. The memory 140 also may be of other type. The memory 140 includes a buffer memory 141 (sometimes referred to as buffer). The memory 140 may include an application/function storage section 142 configured to store application programs and function programs, or perform the operation flow of the electronic device 700 through the CPU 100. The memory 140 may further include a data storage section 143 configured to store data, such as contact person, digital data, pictures, sounds and/or any other data used by the electronic device. A drive program storage section 144 of the memory 140 may include various drive programs of the electronic device for the communication function and/or for performing other functions of the electronic device (e.g., messaging application, address book application, etc.).

The communication module 110 is a transmitter/receiver 110 which transmits and receives signals via an antenna 111. The communication module (transmitter/receiver) 110 is coupled to the CPU 100, so as to provide an input signal and receive an output signal, which may be the same as the situation of the conventional mobile communication terminal.

Based on different communication technologies, the same electronic device may be provided with a plurality of communication modules 110, such as cellular network module, Bluetooth module and/or wireless local area network (WLAN) module. The communication module (transmitter/receiver) 110 is further coupled to a speaker 131 and a microphone 132 via the apparatus 701 for audio output, so as to provide an audio output via the speaker 131, and receive an audio input from the microphone 132, thereby realizing the common telecom function. The speaker 131 herein is corresponding to the four speakers or four groups of speakers.

The apparatus 701 for audio output may comprise any suitable buffer, decoder, amplifier, etc. In addition, the apparatus 701 for audio output is coupled to the CPU 100, so as to record a sound locally through the microphone 132, and play the locally stored sound through the speaker 131.

The embodiment of the present invention further provides a computer readable program, which when being executed in an electronic device, enables a computer to perform the method for audio output as described in Embodiment 1 in the electronic device.

The embodiment of the present invention further provides a storage medium storing a computer readable program, wherein the computer readable program enables a computer to perform the method for audio output as described in Embodiment 1 in an electronic device.

The preferred embodiments of the present invention are described as above with reference to the drawings. Many features and advantages of those embodiments are apparent from the detailed Specification, thus the accompanied claims intend to cover all such features and advantages of those embodiments which fall within the true spirit and scope thereof. In addition, since numerous modifications and changes are easily conceivable to a person skilled in the art, the embodiments of the present invention are not limited to the exact structures and operations as illustrated and described, but cover all suitable modifications and equivalents falling within the scope thereof.

It shall be understood that each of the parts of the present invention may be implemented by hardware, software, firmware, or combinations thereof. In the above embodiments, multiple steps or methods may be implemented by software or firmware stored in the memory and executed by an appropriate instruction executing system. For example, if the implementation uses hardware, it may be realized by any one of the following technologies known in the art or combinations thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

Any process, method or block in the flowchart or described in other manners herein may be understood as being indicative of comprising one or more modules, segments or parts for realizing the codes of executable instructions of the steps in specific logic functions or processes, and that the scope of the preferred embodiments of the present invention comprise other implementations, wherein the functions may be executed in manners different from those shown or discussed (e.g., according to the related functions in a substantially simultaneous manner or in a reverse order), which shall be understood by a person skilled in the art.

The logic and/or steps shown in the flowcharts or described in other manners here may be, for example, understood as a sequencing list of executable instructions for realizing logic functions, which may be implemented in any computer readable medium, for use by an instruction executing system, apparatus or device (such as a system based on a computer, a system including a processor, or other systems capable of extracting instructions from an instruction executing system, apparatus or device and executing the instructions), or for use in combination with the instruction executing system, apparatus or device. In the context, "a computer readable medium" may be any apparatus that can include, store, communicate, propagate or transmit programs for use by an instruction execution system, apparatus or device, or used in conjunction therewith. The computer readable medium for example may be, but not limited to, an electronic, magnetic, optical, electromagnetic, infrared or semiconductor system, apparatus, device or propagation medium. More particular examples of the computer readable medium include (non-exhaustive list): an electrical connection portion (electronic apparatus) having one or more wirings, a portable computer hardware box (magnetic apparatus), a random access memory (RAM) (electronic apparatus), a read only memory (ROM) (electronic apparatus), an Erasable Programmable Read Only Memory (EPROM or flash memory) (electronic apparatus), an optical fiber (optical apparatus), and a portable compact disc-read only memory (CDROM) (optical apparatus). Furthermore, a computer readable medium may be paper or other appropriate media on which the programs may be printed, as the programs may be obtained electronically by optically scanning the paper or other appropriate media and compiling, interpreting, or processing in other appropriate manners when necessary, and then the programs are stored in the computer memory.

The above literal descriptions and drawings show various features of the present invention. It shall be understood that a person of ordinary skill in the art may prepare suitable computer codes to carry out each of the steps and processes described above and illustrated in the drawings. It shall also be understood that the above-described terminals, computers, servers, and networks, etc. may be any type, and the computer codes may be prepared according to the disclosure contained herein to carry out the present invention by using the apparatuses.

Specific embodiments of the present invention have been disclosed herein. A person skilled in the art will readily recognize that the present invention is applicable in other environments. In practice, there exist many embodiments and implementations. The appended claims are by no means intended to limit the scope of the present invention to the above particular embodiments. Furthermore, any reference to "an apparatus configured to . . . " is an explanation of apparatus plus function for describing elements and claims, and it is not desired that any element using no reference to "an apparatus configured to . . . " is understood as an element of apparatus plus function, even though the wording of "apparatus" is included in that claim.

Although a particular preferred embodiment or embodiments have been shown and the present invention has been described, it is obvious that equivalent modifications and variants are conceivable to a person skilled in the art in reading and understanding the description and drawings. Especially for various functions executed by the above elements (parts, components, apparatus, and compositions, etc.), except otherwise specified, it is desirable that the terms (including the reference to "apparatus") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

The invention claimed is:

1. A method for audio output applicable to an electronic device, wherein the electronic device comprises a first speaker, a second speaker, a third speaker and a fourth speaker, the first speaker and the second speaker disposed at the left and right sides of the electronic device placed in a horizontal state, respectively, and the third speaker and the fourth speaker disposed at the left and right sides of the electronic device placed in a vertical state, respectively, the method comprising:
    detecting a placement state of the electronic device when the electronic device is under a speaker output mode; and
    switching, according to the placement state of the electronic device, a stereo output and/or a bass output of audio data to be outputted to a speaker or speakers corresponding to the placement state of the electronic device, and outputting the audio data in the form of stereo output and/or bass output through the speaker or speakers corresponding to the placement state of the electronic device.

2. The method according to claim 1, wherein,
    when the electronic device is placed in the horizontal state, a first stereo output of the audio data is switched to the first speaker, and a second stereo output of the audio data is switched to the second speaker, so as to output the audio data in the form of stereo output through the first speaker and the second speaker.

3. The method according to claim 1, wherein,
    when the electronic device is placed in the horizontal state, a bass output of the audio data is switched to the third speaker and/or the fourth speaker, so as to output the audio data in the form of bass output through the third speaker and/or the fourth speaker.

4. The method according to claim 1, wherein,
    when the electronic device is placed in the vertical state, a first stereo output of the audio data is switched to the third speaker, and a second stereo output of the audio data is switched to the fourth speaker, so as to output the audio data in the form of stereo output through the third speaker and the fourth speaker.

5. The method according to claim 1, wherein,
    when the electronic device is placed in the vertical state, a bass output of the audio data is switched to the first speaker and/or the second speaker, so as to output the audio data in the form of bass output through the first speaker and/or the second speaker.

6. The method according to claim 1, further comprising:
    adjusting audio parameters according to the placement state of the electronic device; and
    determining the stereo output and/or the bass output of the audio data according to the adjusted audio parameters.

7. The method according to claim 1, further comprising:
    switching a handset output of acquired audio data to the first speaker, the second speaker, the third speaker or the fourth speaker when the electronic device is under a handset output mode, and outputting the acquired audio data through the first speaker, the second speaker, the third speaker or the fourth speaker.

8. The method according to claim 1, further comprising:
    detecting distances from the first speaker, the second speaker, the third speaker and the fourth speaker to an ear when the electronic device is under a handset output mode, and determining a speaker closest to the ear respectively; and
    switching a handset output of acquired audio data to the speaker closest to the ear, and outputting the acquired audio data through the speaker closest to the ear.

9. An apparatus for audio output comprised in an electronic device, wherein the electronic device further comprises a first speaker, a second speaker, a third speaker and a fourth speaker, the first speaker and the second speaker disposed at the left and right sides of the electronic device placed in a horizontal state, respectively, and the third speaker and the fourth speaker disposed at the left and right sides of the electronic device placed in a vertical state, respectively, the apparatus comprising:
    a detection unit configured to detect a placement state of the electronic device when the electronic device is under a speaker output mode;
    a switching unit configured to switch a stereo output and/or a bass output of audio data to be outputted to a speaker or speakers corresponding to the placement state of the electronic device, according to the placement state of the electronic device detected by the detection unit; and
    an output unit configured to output the audio data in the form of stereo output and/or bass output through the speaker or speakers corresponding to the placement state of the electronic device.

10. The apparatus according to claim 9, wherein,
    when the electronic device is placed in the horizontal state, the switching unit switches a first stereo output of the audio data to the first speaker, and switches a second stereo output of the audio data to the second speaker; and
    the output unit outputs the audio data in the form of stereo output through the first speaker and the second speaker.

11. The apparatus according to claim 9, wherein,
    when the electronic device is placed in the horizontal state, the switching unit switches a bass output of the audio data to the third speaker and/or the fourth speaker; and
    the output unit outputs the audio data in the form of bass output through the third speaker and/or the fourth speaker.

12. The apparatus according to claim 9, wherein,
    when the electronic device is placed in the vertical state, the switching unit switches a first stereo output of the audio data to the third speaker, and switches a second stereo output of the audio data to the fourth speaker; and
    the output unit outputs the audio data in the form of stereo output through the third speaker and the fourth speaker.

13. The apparatus according to claim 9, wherein,
    when the electronic device is placed in the vertical state, the switching unit switches a bass output of the audio data to the first speaker and/or the second speaker; and
    the output unit outputs the audio data in the form of bass output through the first speaker and/or the second speaker.

14. The apparatus according to claim 9, further comprising:

a control unit configured to adjust audio parameters according to the placement state of the electronic device detected by the detection unit, and determine the stereo output and/or the bass output of the audio data according to the adjusted audio parameters.

15. The apparatus according to claim 9, wherein,
when the electronic device is under a handset output mode, the switching unit switches a handset output of acquired audio data to the first speaker, the second speaker, the third speaker or the fourth speaker; and
the output unit outputs the acquired audio data through the first speaker, the second speaker, the third speaker or the fourth speaker.

16. The apparatus according to claim 9, wherein,
when the electronic device is under a handset output mode, the detection unit detects distances from the first speaker, the second speaker, the third speaker and the fourth speaker to an ear, and determine a speaker closest to the ear respectively;
the switching unit switches a handset output of acquired audio data to the speaker closest to the ear; and
the output unit outputs the acquired audio data through the speaker closest to the ear.

17. An electronic device, comprising:
a first speaker, a second speaker, a third speaker and a fourth speaker, the first speaker and the second speaker disposed at the left and right sides of the electronic device placed in a horizontal state, respectively, and the third speaker and the fourth speaker disposed at the left and right sides of the electronic device placed in a vertical state, respectively; and
an apparatus for audio output comprised in an electronic device, wherein the electronic device further comprises a first speaker, a second speaker, a third speaker and a fourth speaker, the first speaker and the second speaker disposed at the left and right sides of the electronic device placed in a horizontal state, respectively, and the third speaker and the fourth speaker disposed at the left and right sides of the electronic device placed in a vertical state, respectively, the apparatus comprising:
a detection unit configured to detect a placement state of the electronic device when the electronic device is under a speaker output mode;
a switching unit configured to switch a stereo output and/or a bass output of audio data to be outputted to a speaker or speakers corresponding to the placement state of the electronic device, according to the placement state of the electronic device detected by the detection unit; and
an output unit configured to output the audio data in the form of stereo output and/or bass output through the speaker or speakers corresponding to the placement state of the electronic device.

18. The electronic device according to claim 17, wherein the first speaker and the second speaker are disposed in the same horizontal line at the left and right sides of the electronic device placed in the horizontal state, respectively, and the third speaker and the fourth speaker are disposed in the same horizontal line at the left and right sides of the electronic device placed in the vertical state, respectively.

19. The electronic device according to claim 9, wherein one or more of the first speaker, the second speaker, the third speaker and/or the fourth speaker comprise(s) a plurality of speakers.

20. The electronic device according to claim 17, wherein one or more of the first speaker, the second speaker, the third speaker and/or the fourth speaker comprise(s) a plurality of speakers.

* * * * *